(12) United States Patent
Ghossein et al.

(10) Patent No.: US 11,802,357 B2
(45) Date of Patent: Oct. 31, 2023

(54) SYSTEMS, DEVICES, AND METHODS OF ENHANCING CARBON FIBER DISPERSION IN WET-LAID NONWOVENS

(71) Applicants: University of Tennessee Research Foundation, Knoxville, TN (US); UT-Battelle, LLC, Oak Ridge, TN (US)

(72) Inventors: Hicham Kheir Ghossein, Knoxville, TN (US); Lonnie J. Love, Knoxville, TN (US); Uday Kumar Vaidya, Knoxville, TN (US)

(73) Assignees: University of Tennessee Research Foundation, Knoxville, TN (US); UT-Battelle, LLC, Oak Ridge, TN (US)

( * ) Notice: Subject to any disclaimer, the term of this patent is extended or adjusted under 35 U.S.C. 154(b) by 852 days.

(21) Appl. No.: 16/566,593

(22) Filed: Sep. 10, 2019

(65) Prior Publication Data
US 2020/0080244 A1    Mar. 12, 2020

Related U.S. Application Data

(60) Provisional application No. 62/729,622, filed on Sep. 11, 2018.

(51) Int. Cl.
*D04H 1/736* (2012.01)
*C01B 32/05* (2017.01)

(52) U.S. Cl.
CPC ............. *D04H 1/736* (2013.01); *C01B 32/05* (2017.08); *D10B 2101/12* (2013.01)

(58) Field of Classification Search
CPC .... D04H 1/736; D04H 1/4209; D04H 1/4226; D04H 1/4242; D04H 1/4342; D04H 1/732; C01B 32/05; D10B 2101/12; D01F 6/605; D01F 9/12
See application file for complete search history.

(56) References Cited

U.S. PATENT DOCUMENTS

| | | | | |
|---|---|---|---|---|
| 3,645,813 A | * | 2/1972 | Pelikan | D04H 1/736 156/62.4 |
| 4,265,704 A | | 5/1981 | Nahta | |
| 4,278,113 A | * | 7/1981 | Persson | D04H 1/736 141/11 |

(Continued)

OTHER PUBLICATIONS

Ghossein, et al., Innovative Method for Enhancing Carbon Fibers Dispersion in Wet-Laid Nonwovens, Materials Today Communications 2018; 17: 100-108 (Year: 2018).*

(Continued)

*Primary Examiner* — Daniel C. McCracken
(74) *Attorney, Agent, or Firm* — Jenkins, Taylor & Hunt, P.A.

(57) ABSTRACT

The present subject matter relates to systems, devices, and methods of enhancing carbon fiber dispersion in wet-laid nonwovens. A quantity of fibers is deposited in a medium, and each of one or more stirring elements is moved in a pattern to mechanically agitate the medium. In some embodiments, moving each of the one or more stirring elements includes moving the one or more stirring elements in complementary patterns to induce a chaotic advection current within the medium.

4 Claims, 12 Drawing Sheets

(56) References Cited

U.S. PATENT DOCUMENTS

| | | | | |
|---|---|---|---|---|
| 4,697,929 | A | * 10/1987 | Muller | B01F 27/95 |
| | | | | 366/97 |
| 5,409,574 | A | 4/1995 | Razac et al. | |
| 6,066,235 | A | 5/2000 | Scheinberg | |

OTHER PUBLICATIONS

Jana, et al., Experimetnal and computational studies of mixing in complex Stokes flows: the vortex mixing flow and multicellular cavity flows, J. Fluid Mech. 1994; 269: 199-246 (Year: 1994).*

Definition of cross, accessed online at https://www.merriam-webster.com/dictionary/cross on Jan. 10, 2023 (Year: 2023).*

Definition of "intersect," accessed online at https://www.merriam-webster.com/dictionary/intersect on Jan. 10, 2023 (Year: 2023).*

Konopka, "The Effect of Anisotropy In-Plane Liquid Distribution in Nonwoven Fabrics." Raleigh: North Carolina State University, 2001.

Jayachandran, "Fundamentals of Fiber Dispersion in Water; Master Thesis." Raleigh: North Carolina State University, 2000.

Ahmed et al., "Fiber Suspensions in Turbulent flow with Two-Point Correlation." Bangladesh J Sci Res, vol. 46(2), pp. 265-270 (2011).

Amaro et al., "Effect of the electric current on the impact fatigue strength of CFRP composites." Composite Structures, vol. 182, pp. 191-198 (2017).

Boria et al., "Impact behavior of a fully thermoplastic composite." Composite Structures, vol. 167, pp. 63-75 (2017).

Carrillo et al., "Ballistic performance of thermoplastic composite laminates made from aramid woven fabric and polypropylene matrix." Polymer Testing, vol. 31, pp. 512-519 (2012).

Chung, "Review: Materials for vibration damping." Journal of Materials Science, vol. 36, pp. 5733-5737 (2001).

Dweib, "Extensional and Shearing Flow if a Glass-Mat-Reinforced-Thermoplastics (GMT) Materials as a Non-Newtonian Viscous Fluid." Composites Science and Technology, vol. 59, pp. 1399-1410 (1999).

Fathi-Khalfbadam et al., "Analysis and Simulation of Fiber Dispersion in Water Using a Theoretical Analogous Model." Journal of Dispersion Science and Technology, vol. 32(3), pp. 352-358 (2011).

Feraboli et al., "Recyclability and reutilization of Carbon Fiber fabric/epoxy composites." Journal of Composite Materials, pp. 1-15 (2011).

Folgar, "Orientation behaviour of fibers in concentrated suspensions." Journal of Reinforced Plastics, vol. 3, pp. 98-119 (1984).

Guan et al., "Comparison of several image analysis methods for fiber dispersion uniformity in water." Journal of Dispersion Science and Technology, vol. 38(1), pp. 19-25 (2017).

Aref, "Stirring by Chaotic advection." Journal of Fluid Mechanics, vol. 143, pp. 1-21 (1984).

Harbers, "Highly Efficient Production and Characterization of CFRP Made from Recycled Carbon Fibers." Sampe Journal, pp. 7-13 (2014).

Jana et al., "Experimental and Computational studies of mixing in complex Stokes Flows: The vortex mixing flow and multicellular cavity flows." Journal of Fluid Mechanics, vol. 269, pp. 199-246 (1994).

Khakhar et al., "Fluid mixing (Stretching) by time periodic sequences for weak flows." Physics of Fluids, pp. 3503-3505 (1986).

Li et al., "Effect of beating revolution on dispersion of flame attenuated glass wool suspension and tensile strength of associated glass fiber wet-laid mat." Journal of Powder technology, vol. 279, pp. 221-227 (2015).

Mallick, Fiber reinforced Composites: Materials, Manufacturing, and design. New York: Taylor and Francis Group, 2008.

Meleshko, "A blinking rotlet model for chaotic advection." Physics of Fluids, vol. 8, pp. 3215-3217 (1996).

Ramasubramanian et al., "A Computational Fluid Dynamics Modeling and Experimental Study of the mizing process for the dispersion of the synthetic fibers in Wet-Lay forming." Journal of Engineered Fibers and Fabrics, vol. 3(1), pp. 11-20 (2008).

Jones, "The enhancement of mixing by chaotic advection." Physics of Fluids A: Fluid Dynamics, vol. 3(5), pp. 1081-1086 (1998).

Simmonds et al., "Designing Nonwovens to Meet Pore Size Specifications." Journal of Engineered Fibers and Fabric, vol. 2(1), pp. 1-15 (2007).

Tafreshi, "Role of Baffles on Flow Fields Inside Wet-Lay Mixing Tanks and Their Potential Influence on Fiber Dispersion." Textile Research Journal, vol. 73(7), pp. 575-582 (2003).

Thomason et al., "Influence of fiber length and concentration on the properties of glass fiver-reinforced polypropylene: Part 3, Strength and strain failure." Composites Part A, vol. 27, pp. 1075-1084 (1996).

Thomason et al., "Influence of fiber length and concentration on the properties of glass fiver-reinforced polypropylene: Part 1, Tensile and flexural modulus." Composites Part A, vol. 27, pp. 477-484 (1996).

Tiwari, "Surface Treatment of Carbon Fibers—A review." Procedia Technology, pp. 505-512 (2014).

Hartmann, "Scanning probe microscopy on superconductors: Achievements and challenges." Applied Physics A, vol. 59, pp. 41-48 (1994).

Wahjudi et al., "An evaluation of three formation testers using radiata pine and spruce kraft pulps." Appita Journal, vol. 51, pp. 423-427 (1998).

Weller et al., "A tensorial approach to computational continuum mechanics using object-oriented techniques." Computers in Physics, vol. 12(6), pp. 620-631 (1998).

Yang et al., "Mechanical properties of aligned long glass fiber reinforced polypropylene. I: Tensile Strength." Polymer Composites vol. 20(2), pp. 200-206 (1999).

Yang, "Porosity Content Evaluation in Carbon-Fiber/Epoxy Composites Using X-ray Computed Tomography." Polymer-Plastics Technology and Engineering, vol. 53, pp. 217-222 (2014).

Yeole et al., "The Effect of Flocculent and Dispersants on Wet-Laid Process for Recycled Glass Fiber/PA6 Composite." Journal of Polymers & Polymer Composite, vol. 26(3), pp. 259-269 (2018).

Akonda et al., "Recycled carbon fiber-reinforced polypropylene thermoplastic composites." Composite Part A, vol. 43(1), pp. 79-86 (2012).

Boria et al., "Experimental evaluation of a fully recyclable thermoplastic composite." Composite Structures, vol. 140, pp. 21-35 (2016).

Caba et al., "Fiber-fiber interactions in carbon mat thermoplastics." Compos Part A, vol. 38, pp. 469-483 (2007).

Ning et al., "Design and development of thermoplastic composite roof door for mass transit bus." Materials & Design, vol. 30, pp. 983-991 (2009).

Shiffler, "Defective Fibers in Wet-Lay Nonwoven Fabrics." Tappi Journal, vol. 70(6), pp. 117-121 (1998).

Sun et al., "A numerical study of stir mixing liquids with particle method." Chemical Engineering Science, vol. 64, pp. 341-350 (2009).

Nguyen et al., "Long-Fiber Thermoplastic Injection Molded Composites: From process modeling to property prediction." SPE Automotive Composites Conference and Exposition. Troy: SPE; 2005, pp. 1-9.

* cited by examiner

SYSTEMS, DEVICES, AND METHODS OF ENHANCING CARBON FIBER DISPERSION IN WET-LAID NONWOVENS

PRIORITY CLAIM

The present application claims the benefit of U.S. Patent Application Ser. No. 62/729,622, filed Sep. 11, 2018, the disclosure of which is incorporated herein by reference in its entirety.

GOVERNMENT INTEREST

The presently disclosed subject matter was made with U.S. Government support under Grant No. DE-EE0006926 awarded by the Department of Energy, and pursuant to Contract No. DE-AC05-00OR22725 between the United States Department of Energy and UT-Battelle, LLC. Thus, the U.S. Government has certain rights in the presently disclosed subject matter.

TECHNICAL FIELD

The subject matter disclosed herein relates generally to non-woven mats. More particularly, the subject matter disclosed herein relates to production of non-woven mats having carbon fibers incorporated therein.

BACKGROUND

The interest in composite materials is growing in the aerospace, automotive, and military fields as well as industrial applications. [1-3] High strength-to-weight and stiffness-to-weight ratio, lightweight, low fatigue susceptibility, and superior damping capacity give fiber reinforced composites an advantage over conventional materials. [4-6] In particular, for example, carbon fiber is widely used as reinforcement in lightweight structural composite materials, due to its exceptional properties such as high specific modulus, strength, stiffness, electrical properties, and low density. Continuous fiber reinforced composites, however, are generally anisotropic in terms of mechanical properties, costly to produce, and difficult to produce complex shaped parts. In contrast, discontinuous fiber composites can be designed to provide isotropic properties and are easier to process at a low cost for parts with increased complexity. [7-9]

That being said, traditional processing methods for discontinuous fibers have a number of drawbacks. With fiber above critical fiber length (Ic), the full reinforcing potential of the reinforcement is realized due to a higher fiber aspect ratio. The high aspect ratio increases the composites stiffness and strength, and enhances creep and fatigue endurance. [10-14] As fiber length increases, elastic modulus, tensile strength, and impact resistance of fiber composites increase. [15] Traditional processing methods such as extrusion compression molding (ECM) and long fiber injection compression molding (ICM), however, can cause fiber attrition, affecting the fiber aspect ratio and thereby adversely affecting composite strength properties.

To address the issues with conventional methods for processing discontinuous fiber composites, attempts have been made to apply wet laid (WL) techniques that have traditionally been used in paper making and textile industries. [17] Wet laid processes have distinct advantages like high productivity, homogeneous preform material, control of fiber orientation, ability to use recycled fibers and fiber blends, functionalization by addition of fillers, possibility of in-line impregnation, and most important low cost of production. [20] Such processes have recently been adopted to produce non-woven fiber reinforced polymer matrix composite mats, as well as carbon fiber (CF) mats for use in thermoset matrices application. [19]

The dispersion of carbon fiber in wet laid processes is not well optimized, however, leading to a poor mixture, with few studies that have been published exploring various methods to achieve full dispersion. [21] Poor mixing can result in unequal fiber density distribution that causes variance in performance in the final product and an increase in number of defects in the wet laid mats. For example, the use of traditional mixers leads to the formation of vortices with diameters larger than the fiber length, which can lead to fiber defects. The proper dispersion of fibers affects the final mechanical and functional characteristics of the produced mats and composites. Accordingly, improvements to wet-laid processes that address these issues would be desirable.

SUMMARY

In accordance with this disclosure, systems, devices, and methods of enhancing fiber dispersion in wet-laid nonwovens are provided. In one aspect, a system for dispersing fibers in a medium is provided. In some embodiments, the system includes a vessel configured to receive a volume of a medium including a quantity of fibers and one or more agitators that each comprise a stirring element that is movable within the vessel to mechanically agitate the medium. In this configuration, the stirring elements of the one or more agitators are movable in complementary patterns that are configured to induce a chaotic advection current within the medium.

In another aspect, a method for dispersing fibers in a medium is provided. The method includes depositing a quantity of fibers in a medium and moving each of one or more stirring elements in a pattern to mechanically agitate the medium. In some embodiments, moving each of the one or more stirring elements comprises moving the one or more stirring elements in complementary patterns to induce a chaotic advection current within the medium.

In another aspect, a method for producing non-woven mats is provided in which a quantity of fibers is deposited in a medium, each of one or more stirring elements is moved in a pattern to mechanically agitate the medium, the medium is removed to produce a non-woven web of the fibers, and the non-woven web is post-processed to form a non-woven mat of the fibers. In some embodiments, moving each of the one or more stirring elements comprises moving the one or more stirring elements in complementary patterns to induce a chaotic advection current within the medium.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

The present subject matter provides a new mixing regime that creates a chaotic advection current to insure full fiber dispersion. The proposed novel mixing design and development of wet laid nonwoven fiber mats will provide a potential opportunity to expand applications with nonwoven fiber mats. Although wet laid mats can generally have random fiber orientation, such techniques offer a way to produce nonwoven mats with fiber length retention and an ability to tailor fiber orientation. [16]

Figure 1A:
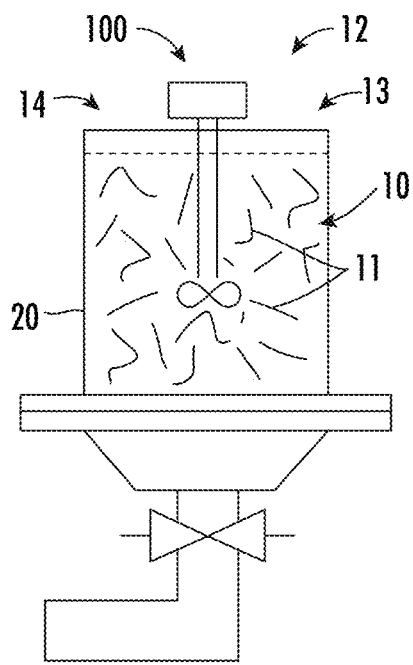
FIGS. 1A through 1C are schematic side views of steps in a wet-laid technique for producing nonwoven mats according to an embodiment of the presently disclosed subject matter.
Figure 1B:
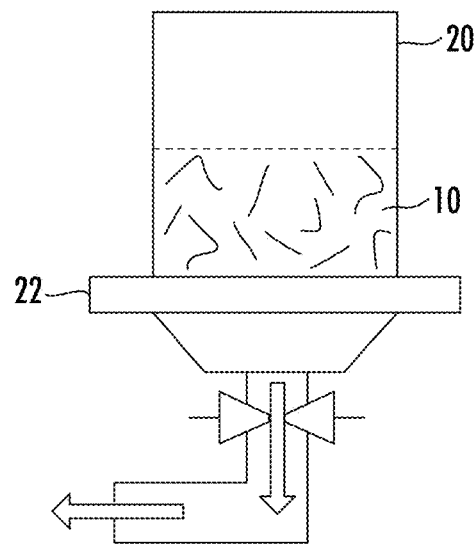
Figure 1C:
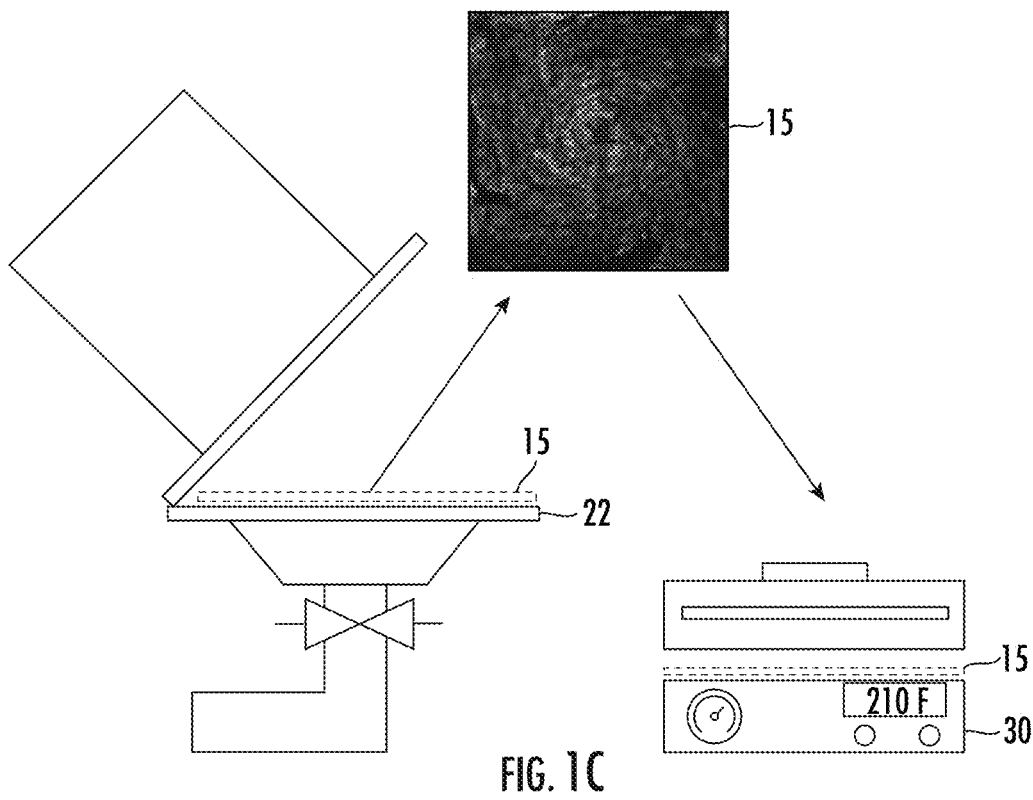

In one aspect, the present subject matter provides systems and methods for producing non-woven mats having fibers incorporated therein from a uniform dispersion of fibers in a medium. The present methods can comprise three main process regimes as shown schematically in FIGS. 1A through 1C. [18] First, in some embodiments, a quantity of fibers are dispersed in a medium 10 contained within a vessel 20 as shown in FIG. 1A. Once the fibers are dispersed in medium 10, the fluid can be removed from the vessel to produce a continuous or discontinuous web formation on a surface. In some embodiments, for example, the fluid can be filtered through a screen 22 provided within vessel 20 as shown in FIG. 1B, and fibers 11 can be thereby deposited on screen 22 in the form of a two-dimensional non-woven web 15. After filtering out the fluid, non-woven web 15 can be post-processed to achieve the desired form. In some embodiments, such post-processing can include one or more of solidification, drying, and winding up of non-woven web 15. As shown in FIG. 1C, for example, non-woven web 15 can be transferred to a dryer 30. Such methods can be used to produce non-woven mats having improved fiber distribution and consistent repeatability.

Referring again to FIG. 1, in the first step of the present methods for producing non-woven mats, a quantity of fibers 11 are dispersed in a medium 10, which can be a solution, contained within a vessel 20. In some embodiments, for example, carbon fibers are dispersed in water, such as un-sized chopped Zoltek™ PX35 Type 02 carbon fiber with a length of 25.4 mm, and average diameter of 7 μm. Those having ordinary skill in the art will recognize, however, that the methods disclosed herein can be similarly applied to other kinds of fibers and mediums, including but not limited to glass fibers, Kevlar fibers, basalt fibers, or any of a variety of other man-made or natural fibers known to man, which can be dispersed in any of a variety of mediums other than water, including but not limited to aqueous solutions, alcohols, or hydrogels. Man-made fibers are less compatible with water than natural fibers as argued by Guan et al. [22] In particular, for example, carbon fibers are widely used as reinforcement material in polymer composites, but they have an inert surface and require further treatment as stated by Tiwari et al. [23] Thus, in some embodiments, medium 10 in which fibers 11 are entrained can be modified by adding additives that enhance the dispersion, wettability, and web formation. There are several example additives that can improve surface wettability of fibers: (a) surfactants 12 are molecules that contain both hydrophilic and hydrophobic moieties, the hydrophobic moieties attach to the hydrophobic fiber and the hydrophilic moieties promote water penetration through the fiber bundle; (b) dispersing agents 13 overcome the hydrophobicity of carbon by creating hydrogen bonds with water molecules; and (c) flocculent agents 14 help the dispersion of fibers, thereby bridging fibers and forming a three dimensional web that collapses into a mat form. [24-25] In some embodiments, effective proportions of additives include 1.5 g of dispersant per cubic foot (Alkyl amine surfactant Nalco 8493™), 1.5 g of viscosity chemicals agents per cubic foot (anionic flocculent Nalclear 7768™), and 0.7 g of binder per cubic foot (polyvinyl alcohol (PVOH)) added to the water. Those having ordinary skill in the art will recognize that these additive quantities are merely exemplary, and other quantities and/or different additives can likewise be used to help enhance the dispersion of a given fiber type.

Although additives such as surfactants can assist in initial fiber bundle dispersion, the dispersion of fibers 11 within medium 10 can further be enhanced using mechanical agitation. That being said, wet laid nonwoven fabrics made from synthetic fibers are prone to defects following mechanical agitation. There are two main types of defects that occur during the wet laid process of carbon fiber, such as: a) log defects that can be defined as bundles of fibers that do not disperse, and b) ropes defects which are fiber assemblages that have unaligned ends that are formed by incomplete dispersion of logs or dispersed fibers that spin around each other in a vortex motion. [26] Fiber logs are normally dispersed through the shear force exerted during the mixing process. In order to disperse log defects, shear force must overcome the forces of friction, tension between the fibers, and the drag force applied by the water current as given by Equation 1:

$$F_s > F_{st} + F_d \qquad \text{Eq. (1) [27]}$$

where $F_s$ is the shear force in Newton exerted on the fiber bundles by agitation of the liquid, $F_{st}$ is the combination of surface tension and friction force between the filaments obtained by $F_{st} = \gamma L$, where $\gamma$ is the constant of proportionality (coefficient of liquid-surface tension), and L is the fiber length. $F_d$ is the drag force that resists fiber dispersion given by Equation 2.

$$F_d = \frac{18\eta}{\rho_f d^2} \frac{C_D R_e}{24} (v_l - v_f) \qquad \text{Eq. (2)}$$

where d and $p_f$ are fiber diameter and density respectively, η is liquid dynamic viscosity, $C_D$ is the drag coefficient, $R_e$ is Reynolds number, vi is liquid linear velocity, and $v_f$ is fiber linear velocity.

The flow of a fiber filled viscous media is controlled mainly through the interactions of fibers at fiber-fiber touch points. A mathematical description of this phenomenon is provided by Dweib, assumed that all such interactions can be formulated as a combination of Coulomb friction between the fibers and hydrodynamic lubrication due to the thin film of liquid between the fibers as given by Equation 3.

$$F_s = \eta \frac{dU}{dx} \quad \text{Eq. (3)}$$

where dU/dx is defined as the rate of change in velocity across the flow field of the fluid. The agitation flow is characterized by Reynolds number $R_e$ that varies between turbulent for $R_e$>4000 and laminar for Re<2000, see Equation 4.

$$R_e = \omega D^2 \rho / \eta \quad \text{Eq. (4)}$$

where ρ is defined as the fluid density, ω is the mixer rpm, and D is the vortex diameter.

The role of fiber properties on the dispersion itself should be considered. Tenacity ($T_t$), that controls the stiffness, crimping and wettability of the fiber plays an important role on the dispersion quality. The concentration ($C_w$) of dispersion, given by Equation (5), controls the amount of fibers to be dispersed based on their tenacity and length, playing an important role on the final gram per square meter (gsm) count of the nonwoven mat. Fiber length, especially for carbon fiber is not recommended to exceed 25.4 mm (1 inch) because will reduce $C_w$, and reduces the gsm value of the mat.

$$C_w = 1.7 * \frac{T_t}{L^2} \quad \text{Eq. (5)}$$

The conventional method of wet laid production is divided into two stages. First, a shear mixer is set to a velocity of 1500 RPM causing a single vortex in the same size as the mixing vessel. Substituting the angular velocity in equation (4) yields a $R_e$>4000 causing a turbulent agitation that aims to disperse the logs. At the second stage the mixer velocity is dropped to 300 RPM to obtain a $R_e$<2000 to produce a laminar agitation, based on equation (4), in order to reduce rope formation. Shiffler has indicated that turbulent flow has a powerful effect on rope formation, where the chance of their formation is greater to occur than in a laminar flow. [29] This study concludes that the reduction of the vortex formation can be a key factor in reduction of rope formation. However, the suppression of the vortex flow did not eliminate the rope defect formation as shown in the experimental section of this paper. In single vortex system, due to constant angular velocity, the fluid reaches a steady state in rotation known as the rigid body motion that causes the fibers to adjust their velocity to that of the fluid, reducing in turn the velocity gradient to a near zero value. [30] Such reduction eliminates the effect of shear force and results in an increase in defects.

Several attempts to improve dispersion in the wet laid system were performed by researchers. Jayachandran proposed a system with baffles in an attempt to induce chaotic advection and control vortices formation. [17] His study is supported by a computer simulation that details the process and highlights stagnation points behind the baffles. Tafershi studied the important role of baffles in vortex control and their influence on rope formation by placing the baffles at different locations within the vessel. [31] In each case, however, the baffles were static. Sun used the mixing particle semi-implicit (MPS) method to investigate the fundamental characteristics of stir mixing of viscous liquid with two rods rotating at different input speeds. [32] He concluded that the mixing rate is affected by the stick velocity, position, number, direction of rotation, and the liquid viscosity. Still, all of these approaches were dependent on vortices generated by propellers with diameters at double the length of the fibers at least.

The formation of the vortex is the subject of some literature summarized here, and its relevance to the wet laid process in our work. Ahmed reported that the velocity of the fiber fluctuates around the mean velocity of flow. [33] Therefore, with higher velocity fluctuation the orientation distribution of the fibers becomes wider. This phenomenon is known as chaotic advection. A ref performed a study on stirring by chaotic advection, the blinking vortex flow, and proved that it leads to better mixing. [34] This finding was supported by several researchers that studied the enhancement of mixing by chaotic motion. [35-37] Jana discussed that the velocity field that can be used as proof of obtaining chaotic advection for better mixing of a complex stokes flow is only available from numerical computations. [38] That was proven by exploring the vortex mixing flow and expanding the investigations in driven cavity flow to multicellular cavity flows. Both studies proved the achievement of chaotic advection in order to improve the mixing in the system.

Figure 2:
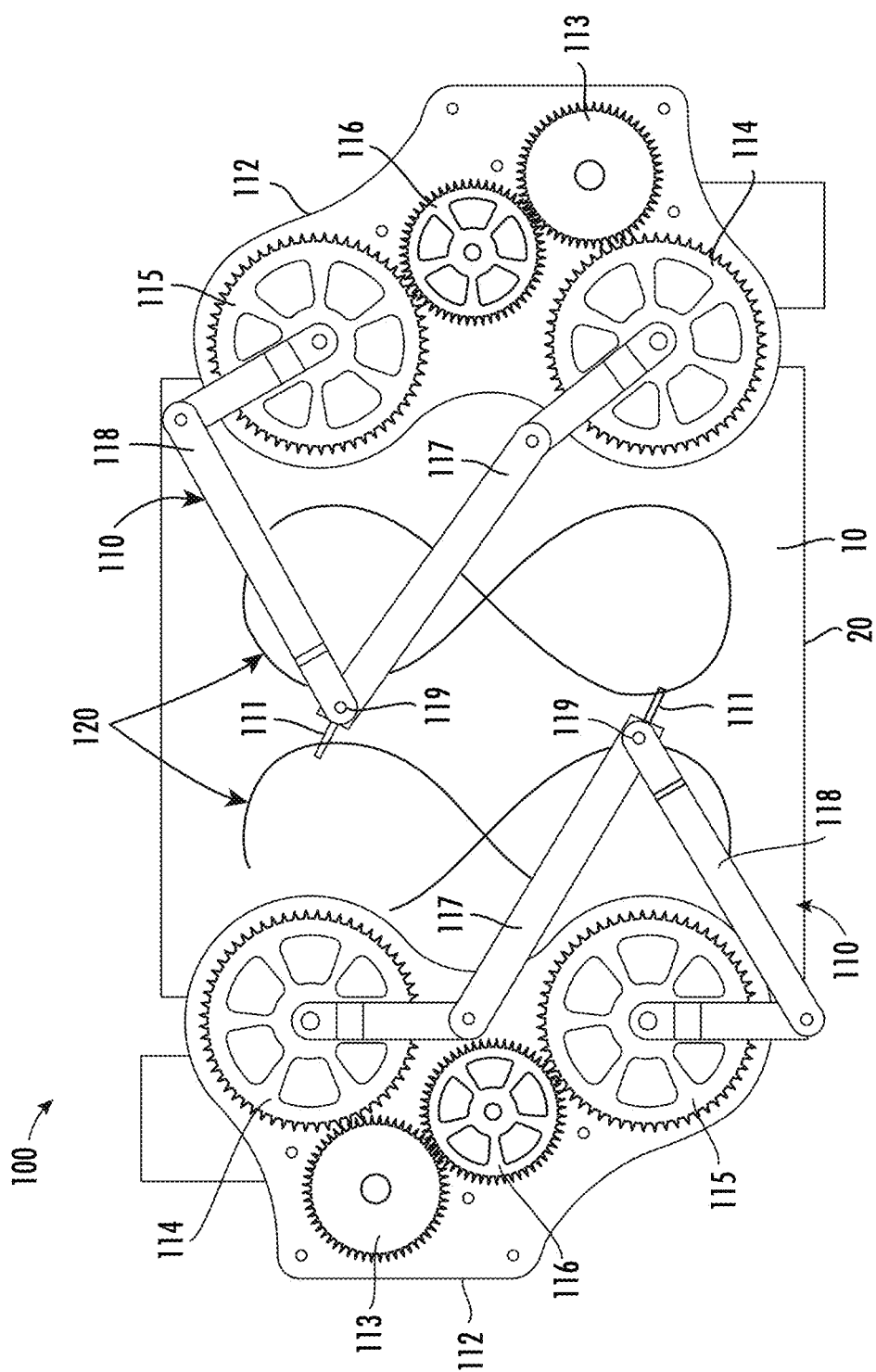
FIG. 2 is a schematic top view of a mixer according to an embodiment of the presently disclosed subject matter.

With a carbon fiber length of 25.4 mm, a new system was needed that provides full dispersion through chaotic advection without causing defects in the produced mats. In this regard, in another aspect, the present subject matter provides an improved system for dispersing fibers in a medium. As illustrated in FIG. 2, a mixing system, generally designated 100, is designed to generate chaotic advection within medium 10 and result in fully dispersed mats. One or more agitators 110 are each separately movable within vessel 20 in patterns 120 that are configured to mechanically agitate medium 10. In the exemplary configuration illustrated in FIG. 2, for example, the one or more agitators 110 includes two stirring elements 111, such as paddles, that are each movable within vessel 20 to mechanically agitate medium 10. In some embodiments, stirring elements 111 are composed of Acrylonitrile Butadiene Styrene (ABS), polycarbonate, wood, metal, or any of a variety of other materials that are sufficiently stiff and non-reactive. In some embodiments, three or more stirring elements 111 can be provided, which can in some configurations increase the speed at which the fibers are dispersed within vessel 20.

To control the operation of agitators 110, a drive system 112 is coupled to each stirring element 111 to move the respective stirring element 111 in a predetermined pattern designed to mechanically agitate medium 10. In the embodiment illustrated in FIG. 2, each drive system 112 includes a drive gear 113 that is driven by a power source. In some embodiments, the power source is a variable speed 12 V DC motor. Drive gear 113 is coupled for rotation together with a first output gear 114 and a second output gear 115. In some embodiments, second output gear 115 is rotationally coupled to drive gear 113 by an intervening idler gear 116 that reverses the rotation of second output gear 115 relative to drive gear 113. First drive output gear 114 and second output gear 115 are then coupled to stirring element 111 by a first connecting arm 117 and a second connecting arm 118, respectively, at a connector 119. In some embodiments, connector 119 is a hinged connector, and stirring element 111 is connected in line with the hinge axis. In some embodiments, first and second connecting arms 117 and 118 are offset above the gear assembly in order to provide 360° clearance for the connecting arms.

With this configuration, the rotation of drive gear 113 drives a complex movement of stirring element 111 within medium 10. Those having ordinary skill in the art will recognize, however, that the embodiment illustrated in FIG. 2 is presented as one exemplary configuration that produces a complex set of complementary patterns of movement 120. Those having ordinary skill in the art will recognize that such a gear-driven configuration achieves a desired patterned motion of stirring element 111 at a low cost compared to other drive mechanisms, although any of a variety of other mechanical configurations for agitators 110 can be used to achieve similar patterns of movement for stirring elements 111. For example, arrangements of computer-controlled linear actuators, robotic arms, or any of a variety of other mechanical systems are capable of reproducing a range of patterns of movement. In some embodiments, drive system 112 moves stirring element 111 in a substantially planar pattern, and the length of stirring element 111 propagates this pattern through the depth of vessel 20 to generate currents throughout vessel 20. Alternatively or in addition, drive system 112 can be configured to move stirring element 111 in a three-dimensional range of motion to further facilitate movement of fibers throughout vessel 20. In any configuration, agitators 110 are designed to move stirring elements 111 in complementary patterns 120 that are configured to induce a chaotic advection current within medium 10.

In some embodiments, for example, such a configuration can cause stirring element 111 to move in a pattern that is substantially a figure-eight shape as illustrated in FIG. 2. Those having ordinary skill in the art will recognize, however, that any of a variety of other movement patterns that result in the one or more stirring elements 111 moving in complementary patterns that are configured to induce a chaotic advection current within the medium, including but not limited to patterns that resemble and X-shape or oval shapes. In some embodiments, the design allows agitators 110 to vary the individual traveling velocities of stirring elements 111, control the relative velocities and/or accelerations of stirring elements 111, and/or produce frequent changes in the direction of movement of stirring elements 111, which individually or together produce a variable shear within medium 10 leading to a chaotic advection current that causes multiple vortices collision. In this regard, complex motion of stirring elements 111 simulates a horseshoe map phenomenon in order to attain improved stirring and mixing by chaotic advection. The chaotic advection induced by the path-crossing currents generated by the motion creates several vortices that vary in diameter but last for a short period of time due to vortex-to vortex-collision. These vortices collisions shorten the existence time of the vortices and cause them to dissipate, as discussed by Green. [39] Continuous vortex dissipation due to collisions prevents rigid body motion formation, leading to a decrease in rope defect formation and increase in bundle-to-bundle collisions.

Experimental Design
Sample Preparations and Experimental Setup

To illustrate the improvement in mat formation, two different sets of carbon fiber mats were processed. The first set was processed using a conventional shear mixer; the second was prepared with the proposed innovative mixing system 100. The conventional shear mixer was used at two stages. First, the mixer is set to a speed of 1500 rpm, then at 300 rpm. These velocities provide a $R_e$>4000 at 1500 RPM and $R_e$<2000 for 300 RPM in an attempt to prevent rope defects formation. Using mixing system 100, the design allows agitators 110 to induce chaotic advection, which causes a variable velocity gradient that leads to improved mixing. In order to study the effect of the mixing time on the fiber dispersion, mats were prepared using total mixing times of 10 min, 20 min and 30 min for each mixing method. In the conventional mixing, the time is split equally between both stages of mixing. Each process was repeated three times in order to study the repeatability of the mixing method.

For the experimental tests, chopped carbon fiber was added at fiber total volume of 1% of the water volume to not exceed $C_w$. After the desired time of mixing, water was drained by gravity force and the dispersed fibers form a mat (355.6 mm×355.6 mm (14"×14")) on the screen 22 in the bottom of vessel 20. A vacuum machine is used to remove excess water then mats are placed in an Emerson Speed Dryer (Model 145) at 210° F. for 30 minutes to dry.

Wahjudi stated that a high-quality wet laid mat is measured by its structural uniformity as it affects surface quality, strength, and aesthetic appearance of the mat. [40] Several methods were proposed by researchers to analyze the dispersion of fibers in the wet laid process like X-ray techniques, microscopy and mechanical testing. [41-43] Carbon fiber has an average diameter of 7 µm and low atomic number that makes the use of X-ray technique very challenging to investigate and evaluate the fabricated mats. [44] Moreover, microscopy technique is known to be laborious with an extensive sample preparation. [45] To address these issues, a back light scattering (BLS) technique was used to characterize the mat pores distribution to investigate fiber density distribution and insure that full fiber dispersion was obtained.

Results and Discussion
CFD for New Mixer Design

Figure 3A:
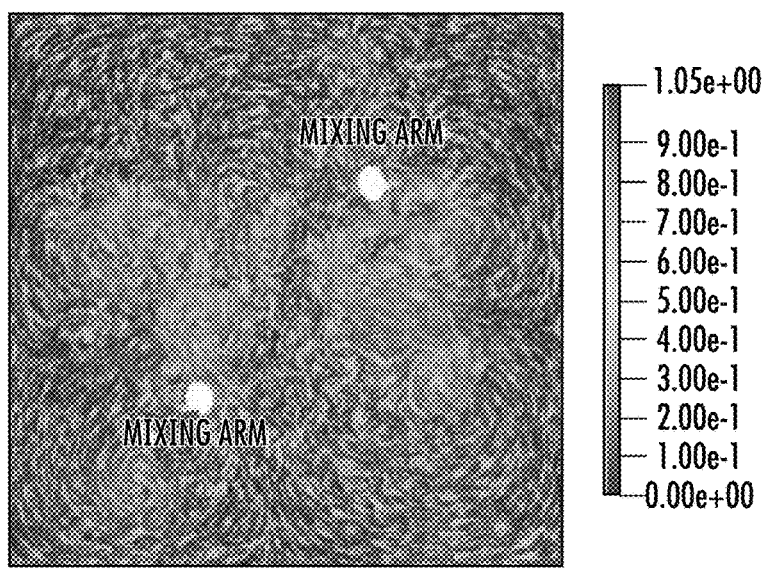
FIGS. 3A through 3C are computational fluid dynamic models showing velocity vector fields at three times during a mixing method according to an embodiment of the presently disclosed subject matter.
Figure 3B:
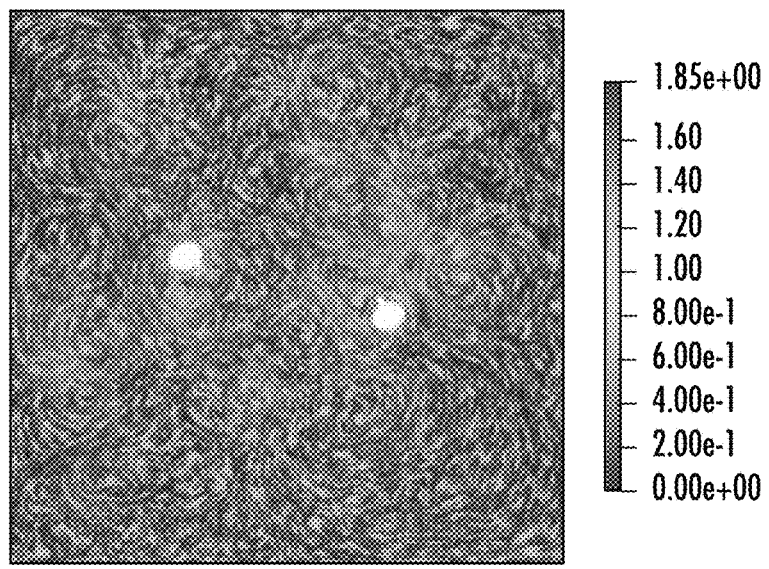
Figure 3C:
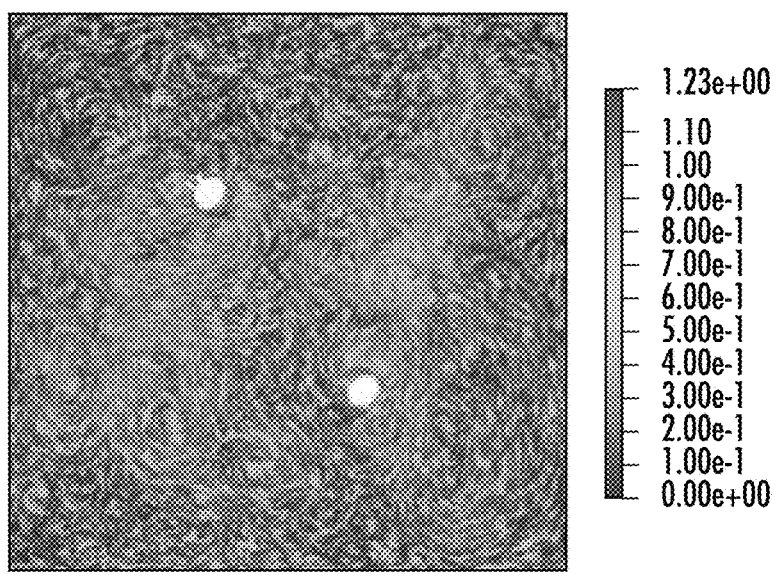

A Computational Fluid Dynamic (CFD) simulation was conducted using OpenFOAM software version 5.0 using PimpleDyMFoam numerical solver, which uses the hybrid PISO-SIMPLE (PIMPLE) algorithm and dynamic meshing to verify the production of chaotic advection by the proposed mixer. [46] The simulation used 50,240 cells in a finite volume solver, applying Direct Navier Stokes (DNS) for true simulation with continuous fluid and no slip conditions on hard surfaces. FIGS. 3A-3C show the top view for the evolution of the velocity profile across the vessel at 1.5 s, 3 s, and 4.5 s, respectively. The vector orientation presents various orientations demonstrating chaotic advection pattern that has been demonstrated to provide improved mixing as discussed in the theoretical background discussion above. The vessel is divided into four (4) equal quadrants, and the velocity components are measured at the centers of each quadrant over time. The velocity component shows an irregular pattern associated with chaotic mixing. Furthermore, the number of vortices present in the flow increases with each cycle of mixing system 100, which is also indicative of chaotic motion. With every change of the direction of stirring elements 111, a new vortex is generated, leading to an ever more complex velocity profile. These numerical results support the previously mentioned hypothesis that mixer system 100 is efficient at generating chaotic advection.

Experimental Results

Figure 4A:
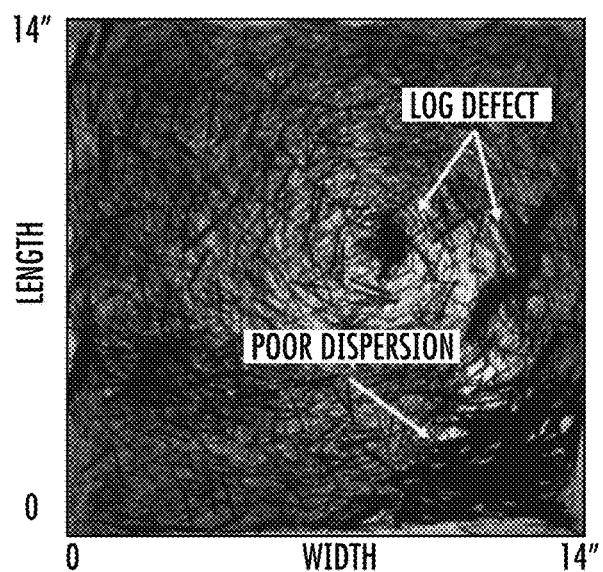
FIGS. 4A through 4F are back light scattering images of nonwoven mats produced by mixing methods according to embodiments of the presently disclosed subject matter.
Figure 4B:
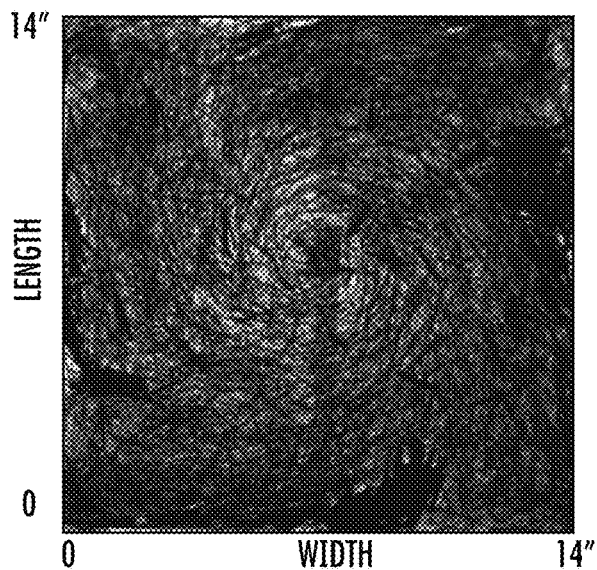
Figure 4C:
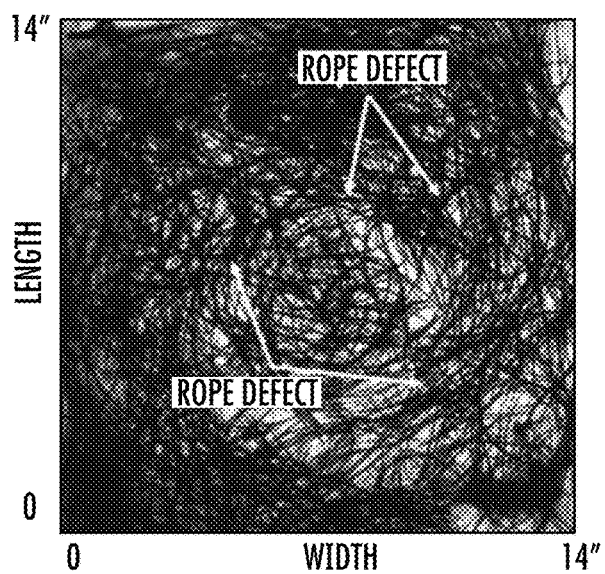
Figure 4D:
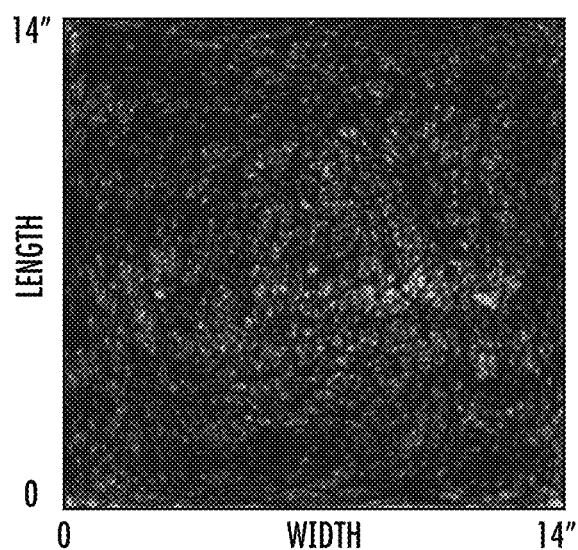
Figure 4E:
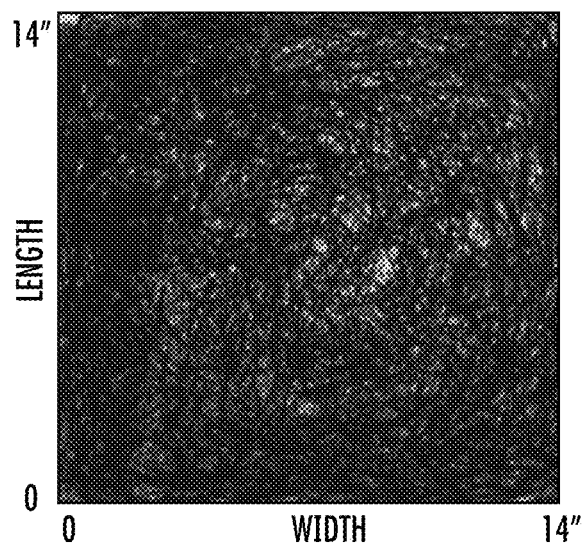
Figure 4F:
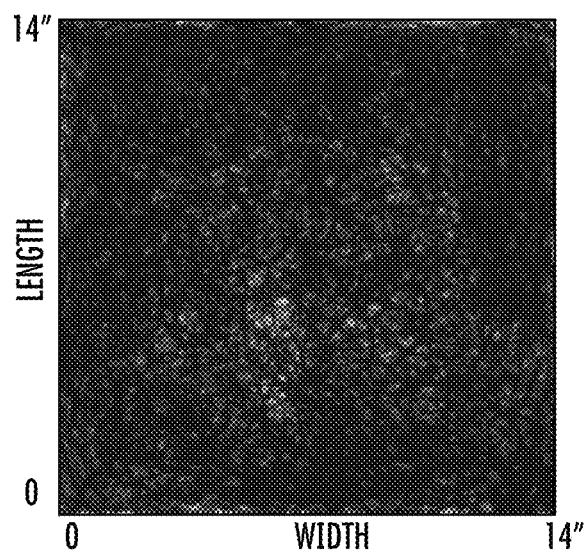

FIGS. 4A-4F show the mats produced using both the conventional mixer (FIGS. 4A-4C) and mixing system 100 (FIGS. 4D-4F) for mixing times of 10 min, 20 min and 30 min as characterized by the back light scattering technique. Qualitative analysis of the images shown in FIGS. 4A-4F shows the contrast difference of fibers distribution quality between the two methods, especially at 30 min mixing time. It can be noticed in FIG. 4C that the conventional mixer at 30 min mixing time presents defects, gaps and in general poor distribution. In contrast, FIG. 4F shows that mixing system 100 mat at 30 min mixing time presents no defects with a good fiber distribution. As for time variable within the same method, using conventional mixer, it was observed that longer mixing time resulted in a reduction in the poor distribution (Observed in the corner of FIG. 4A). However, rope defects were dominant at 30 min mixing time as seen in FIG. 4C. The spiral pattern seen in FIG. 4C falls in accordance with the theoretical background explanation of the rigid body motion and that of rope formation during such motion in large diameter vortices. The use of mixing system 100 shows consistent qualitative value throughout the different mixing times, as shown in FIGS. 4D-4F.

Figure 5A:
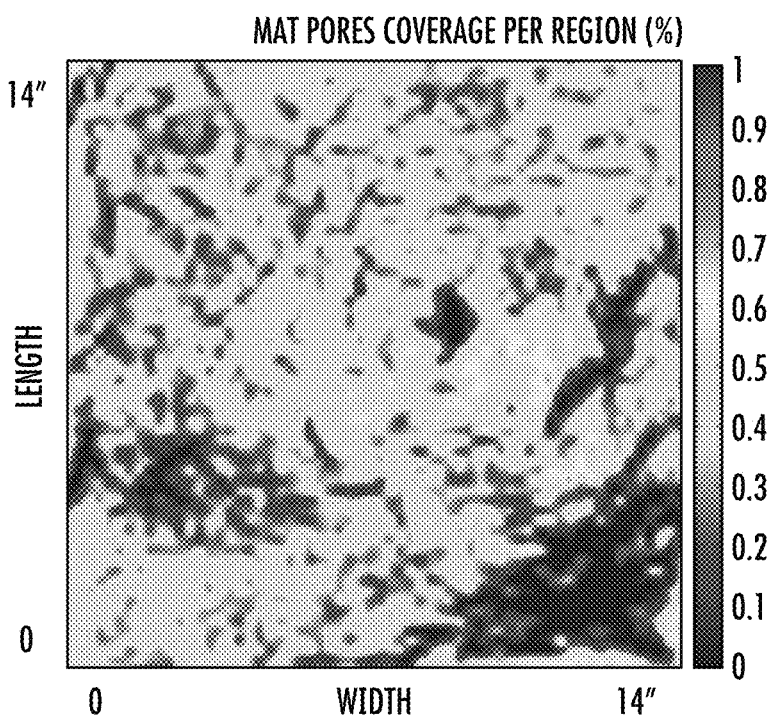
FIGS. 5A through 5F are maps of map pores coverage percentage of nonwoven mats produced by mixing methods according to embodiments of the presently disclosed subject matter.
Figure 5B:
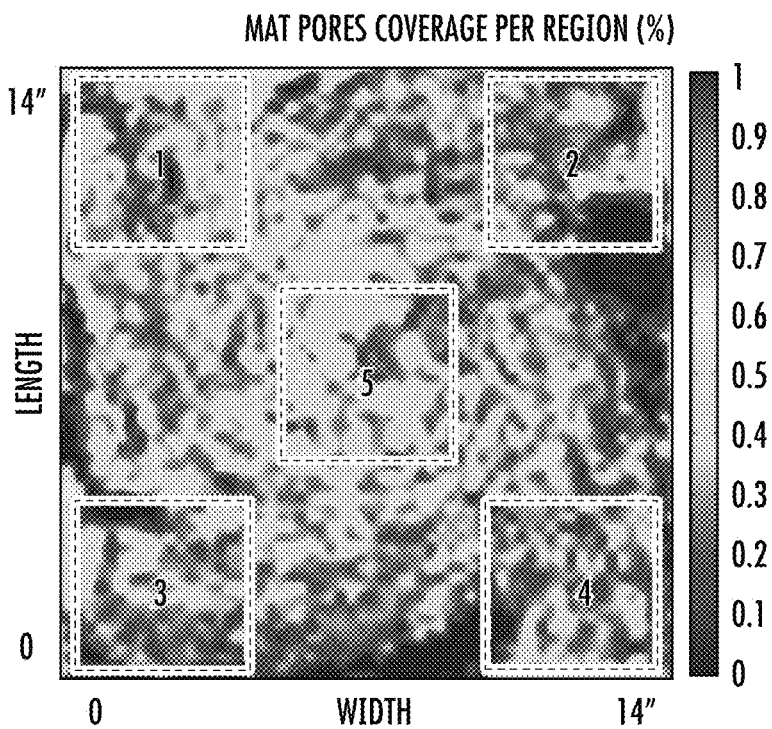
Figure 5C:
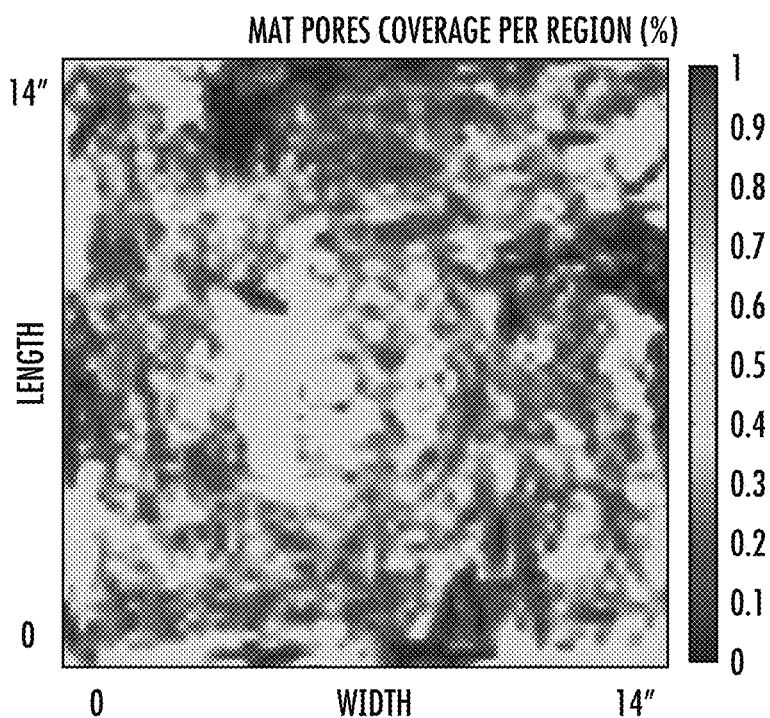
Figure 5D:
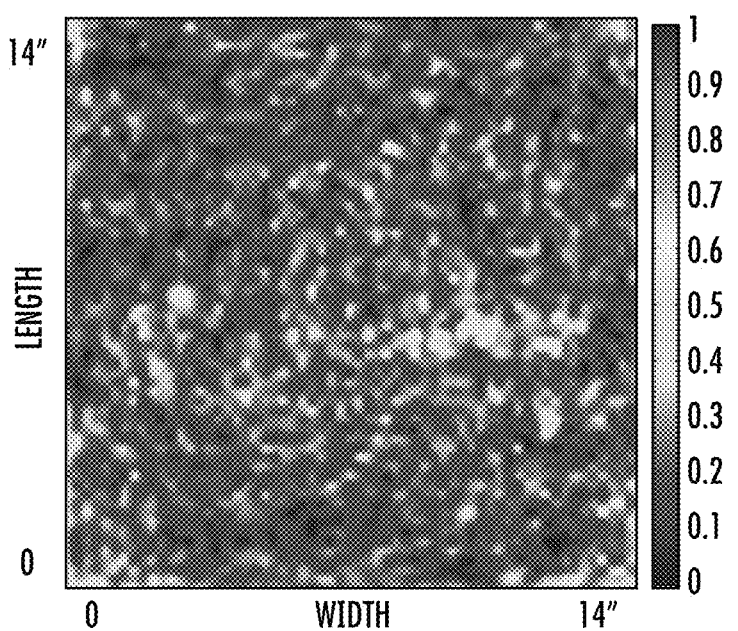
Figure 5E:
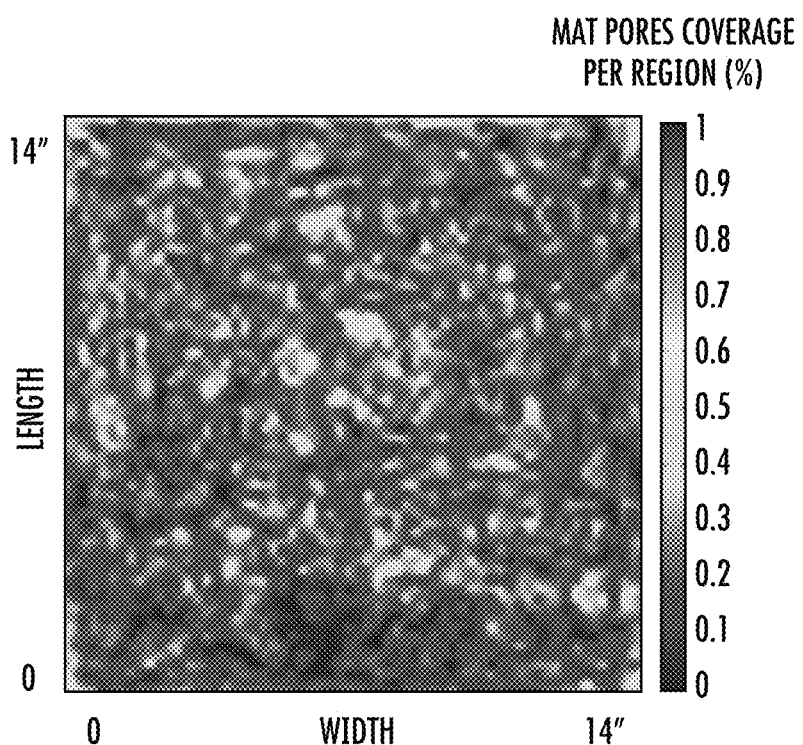
Figure 5F:
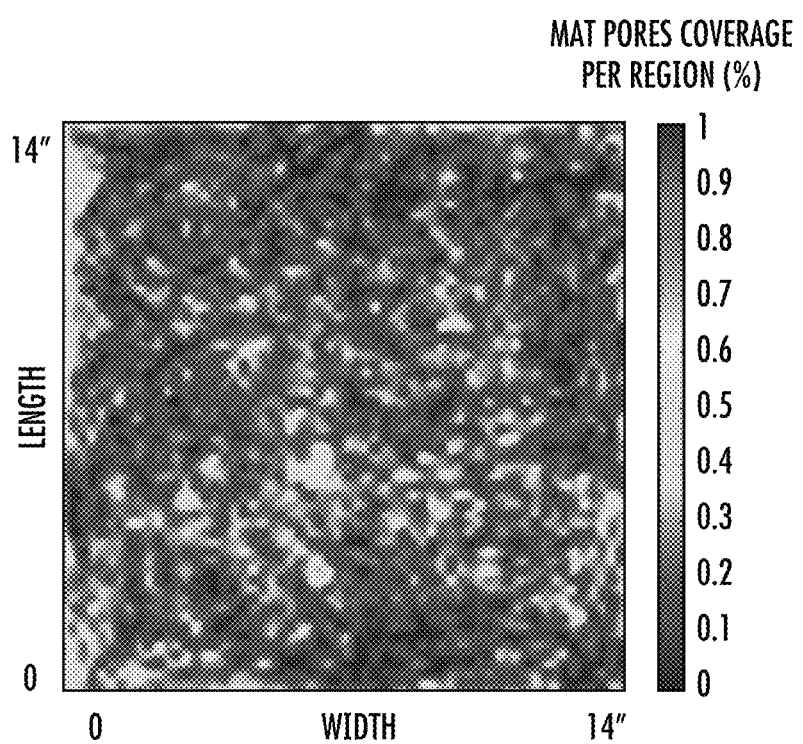

In order to obtain quantitative measures, images were converted to color maps based on light intensity using code written in MATLAB R2017b, the resulting color maps are shown in FIGS. 5A-5F, with FIGS. 5A-5C representing mat pores coverage percentage of the conventional mixer at 10 min, 20 min, and 30 min, and FIGS. 5D-5F representing mat pores coverage percentage of mixer system 100 at 10 min, 20 min, and 30 min. The process starts by defining the mats corners and translating them into a bounding box, so a coordinate system can be drawn for measurements collection. The images were covered by a grid system with each grid cell having the dimensions of 64×64 pixels and associate a value to each pixel based on light intensity threshold on a scale of 0 to 256 on the RGB scale. The resulting images are measured in percentage of intensity threshold for every pixel with 0 representing total darkness (i.e. lack of fiber dispersion "pores") and 1 representing maximum RGB value of 256. This quantification allows the numerical measurement of the mats pores distribution presented in a color map format, wherein a value of 1 represents no presence of fibers and that of zero represents no presence of pores in the mat. Mean distribution of the percentage of intensity threshold for pixels in each cell was calculated, as presented in Table 1:

TABLE 1

Mean distribution of mat pores coverage percentage in each region of interest

| Average Porosity Distribution | | | Region 1 | | Region 2 | | Region 3 | | Region 4 | | Region 5 | |
|---|---|---|---|---|---|---|---|---|---|---|---|---|
| | | | Mean Avg (%) | Stdv (%) | Mean Avg (%) | Stdv (%) | Mean Avg (%) | Stdv (%) | Mean Avg (%) | Stdv (%) | Mean Avg (%) | Stdv (%) |
| Conv. mixer | 10 min | Mat 1 | 34.5 | 10.7 | 39.1 | 8.0 | 35 | 12.3 | 14.3 | 15.9 | 40.6 | 12.5 |
| | | Mat 2 | 23.5 | 20.8 | 37.7 | 9.9 | 35.1 | 15.0 | 35.6 | 12.0 | 47.3 | 8.6 |
| | | Mat 3 | 39.7 | 10.2 | 37.0 | 14.2 | 41.4 | 13.2 | 37.1 | 14.4 | 42.0 | 13.1 |
| | 20 min | Mat 1 | 15.9 | 14.8 | 21.9 | 19.0 | 25.2 | 17.6 | 19.8 | 16.9 | 32.0 | 15.5 |
| | | Mat 2 | 33.7 | 10.0 | 25.6 | 13.5 | 27.9 | 11.5 | 26.7 | 10.9 | 35.9 | 9.9 |
| | | Mat 3 | 26.3 | 12.8 | 28.2 | 12.2 | 31.0 | 8.7 | 27.8 | 10.8 | 36.1 | 8.0 |
| | 30 min | Mat 1 | 32.1 | 15.1 | 27.4 | 14.3 | 23.5 | 14.5 | 28.7 | 14.8 | 32.4 | 14.0 |
| | | Mat 2 | 20.1 | 13.5 | 30.4 | 13.6 | 30.0 | 13.6 | 23.6 | 12.3 | 37 | 14.0 |
| | | Mat 3 | 25.6 | 13.8 | 33.7 | 14.2 | 25.1 | 14.1 | 18.6 | 14.4 | 33.2 | 15.2 |
| Mixing system 100 | 10 min | Mat 1 | 16.5 | 7.8 | 18.3 | 7.9 | 20.0 | 7.4 | 20.2 | 8.7 | 23.0 | 8.0 |
| | | Mat 2 | 23.1 | 8.5 | 21.9 | 8.7 | 16.9 | 8.9 | 20.8 | 7.4 | 23.9 | 8.1 |
| | | Mat 3 | 20.3 | 8.6 | 21.0 | 9.6 | 23.0 | 8.0 | 28.1 | 10.3 | 27.6 | 8.9 |
| | 20 min | Mat 1 | 22.7 | 7.0 | 21.4 | 7.2 | 20.2 | 7.4 | 20.6 | 6.7 | 22.5 | 6.8 |
| | | Mat 2 | 20.8 | 8.4 | 19.7 | 8.7 | 17.8 | 8.7 | 19.6 | 6.0 | 24.3 | 9.3 |
| | | Mat 3 | 19.6 | 7.6 | 22 | 6.3 | 22.8 | 7.6 | 23.5 | 5.6 | 22.9 | 7.4 |
| | 30 min | Mat 1 | 20.4 | 8.3 | 14.3 | 9.1 | 16.0 | 8.0 | 14.3 | 7.8 | 22.8 | 8.1 |
| | | Mat 2 | 17.7 | 9.2 | 16.6 | 9.2 | 22.2 | 9.7 | 20.7 | 9.9 | 22.8 | 9.2 |
| | | Mat 3 | 23.0 | 8.0 | 27.5 | 4.8 | 25.8 | 6.5 | 25.0 | 6.6 | 24.3 | 5.2 |

Table 1: Mean Distribution of Mat Pores Coverage Percentage in Each Region of Interest Five regions of interest were selected, as shown in FIG. 5B. Each region measured 3.5×3.5 inches. All measured percentage of intensity threshold pixel values were compared to the calculated theoretical value. The theoretical value was calculated by considering a perfectly isotropic mat. In such mat, fiber distribution is equal across all unit areas with equal coverage percentage of fibers. Simmonds et al. showed that the probability P(n) that any given point is covered by n fibers present per unit area is given by Poisson distribution of the form, see Equation 6:

$$P(n) = \frac{e^{-k} k^n}{n!}$$ Eq. (6)

where, k is the total coverage area of fibers per unit area of the plane. Considering that k=nLd, L is the fiber length and d fiber diameter. In order to calculate the theoretical value of mat's pore coverage per unit area, one must consider the value of P(0) where no fibers are present, as given by Equation 7:

$$P(0) = e^{-k}$$ Eq. (7)

The constant k was evaluated at 1.97 for a nonwoven with a basis weight of 215 gsm leading to a value of P(0)=0.14.

Figure 6A:
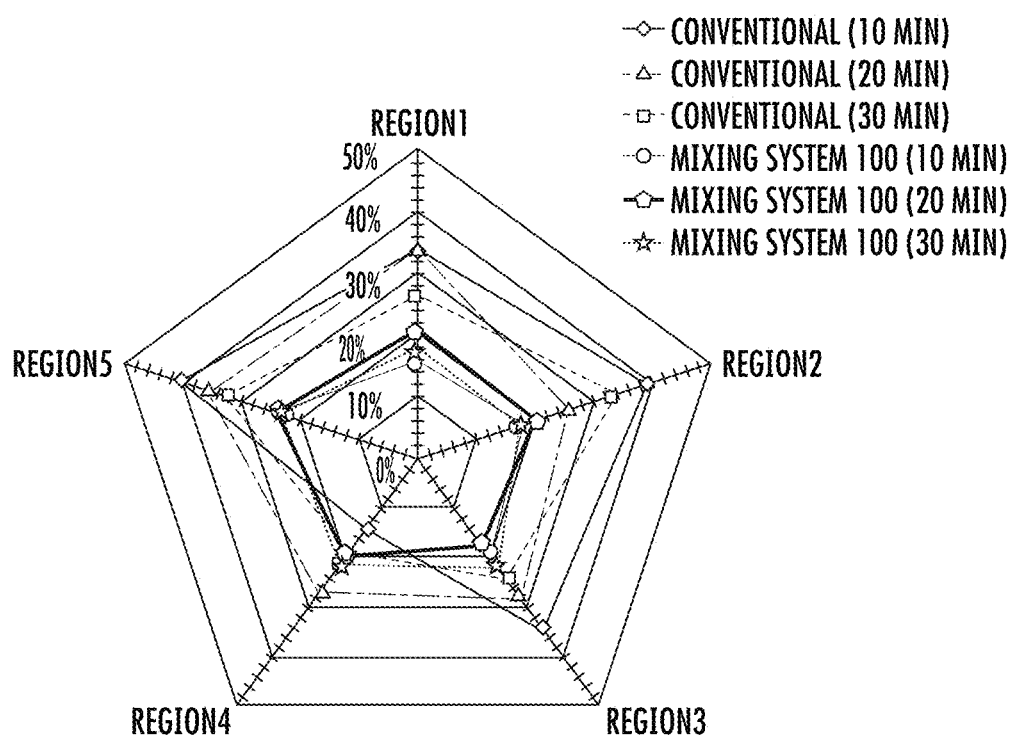
FIGS. 6A and 6B are radar plots illustrating the effect of mixing time on the mat pores coverage percentage for mixing methods according to embodiments of the presently disclosed subject matter.
Figure 6B:
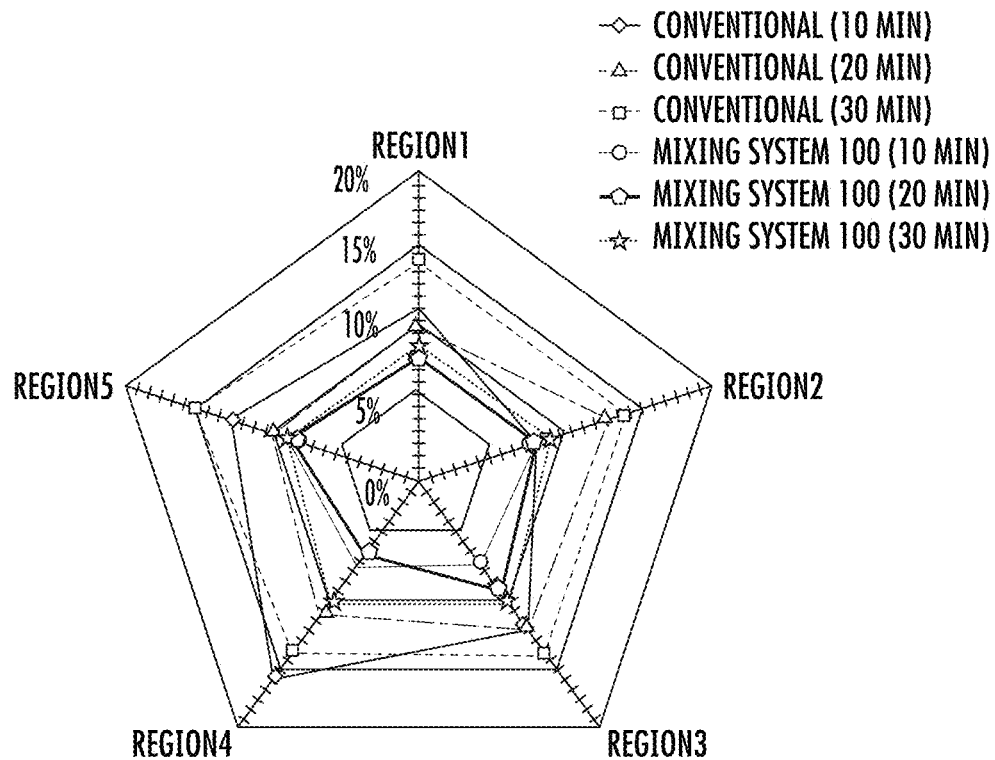

FIGS. 6A and 6B show radar plots for mean distribution of the percentage of intensity threshold of pixels representing mat pores coverage percentage in each region of interest. In FIG. 6A, which illustrates mat pores coverage percentage per region, it is noticed that mixing using the conventional mixer at 10 min shows a low mat pores coverage percentage of 14.3% in region 4. This result is due to the fact that fibers clustered in that region due to lack of distribution. While in region 5, the mat pores coverage percentage goes up to 40.7%. FIG. 6B shows a standard deviation graph of the pixels in the region, which indicates a value of 15.9% for region 4 and that of 12.5% for region 5. Standard deviation of the variation of values on the selected portion of the grid above 10% is an indication of the poor fiber distribution. By comparison, FIG. 6B shows that the use of mixing system 100 at 10 min shows higher consistency with values of 20.8% at region 4 and that of 23.9% at region 5 with standard deviations of 8.7% and 8% respectively, providing more trust in the consistency of fiber distribution across the mat. The effect of increasing the time of mixing did not show improvement on the dispersion for the conventional mixer, but alternatively created more rope defects. As an example, the maximum variation is observed in region 4, as it was 14.3%, 26.7%, 18.6% differences for 10 min, 20 min, and 30 min respectively. However, in using mixing system 100, these values are observed to be 20.8%, 20.6%, 20.7% differences for 10 min, 20 min, and 30 min, respectively, an indication that once dispersion is achieved using mixing system 100, the additional time of mixing had minimal effects on the mat quality.

Figure 7A:
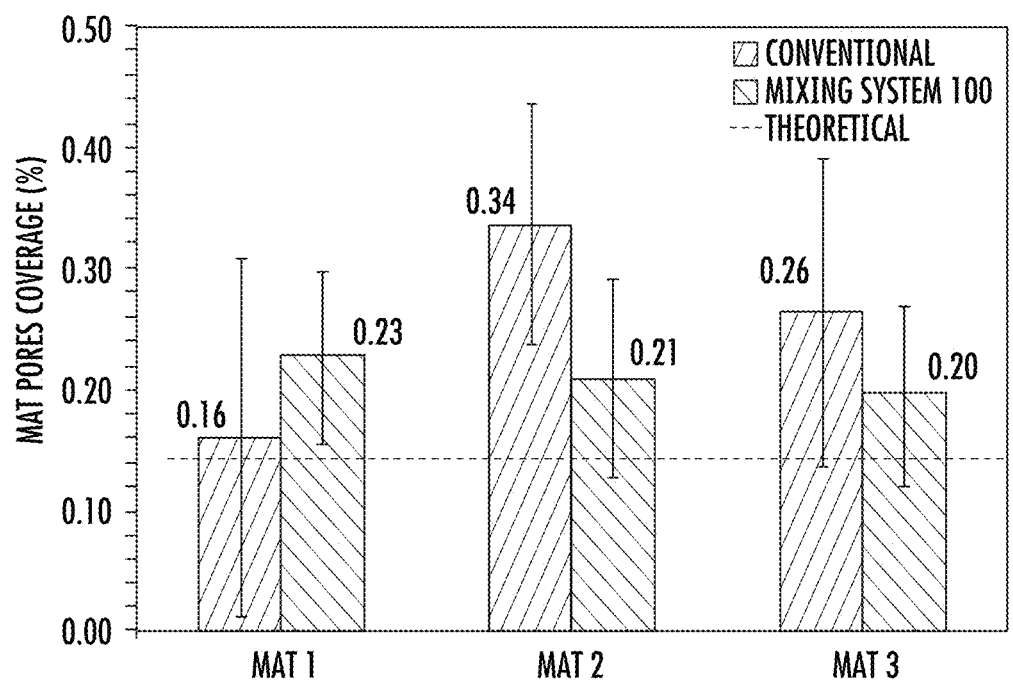
FIGS. 7A through 7F are graphs illustrating mat pores coverage percentage for mats fabricated using mixing methods according to embodiments of the presently disclosed subject matter.
Figure 7B:
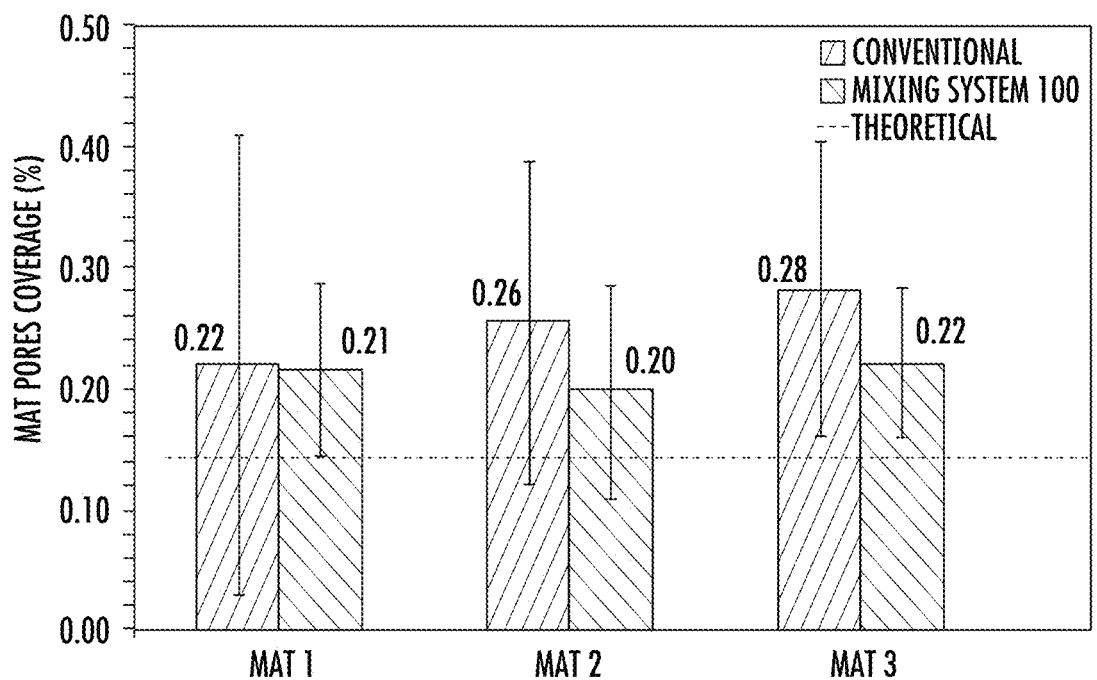
Figure 7C:
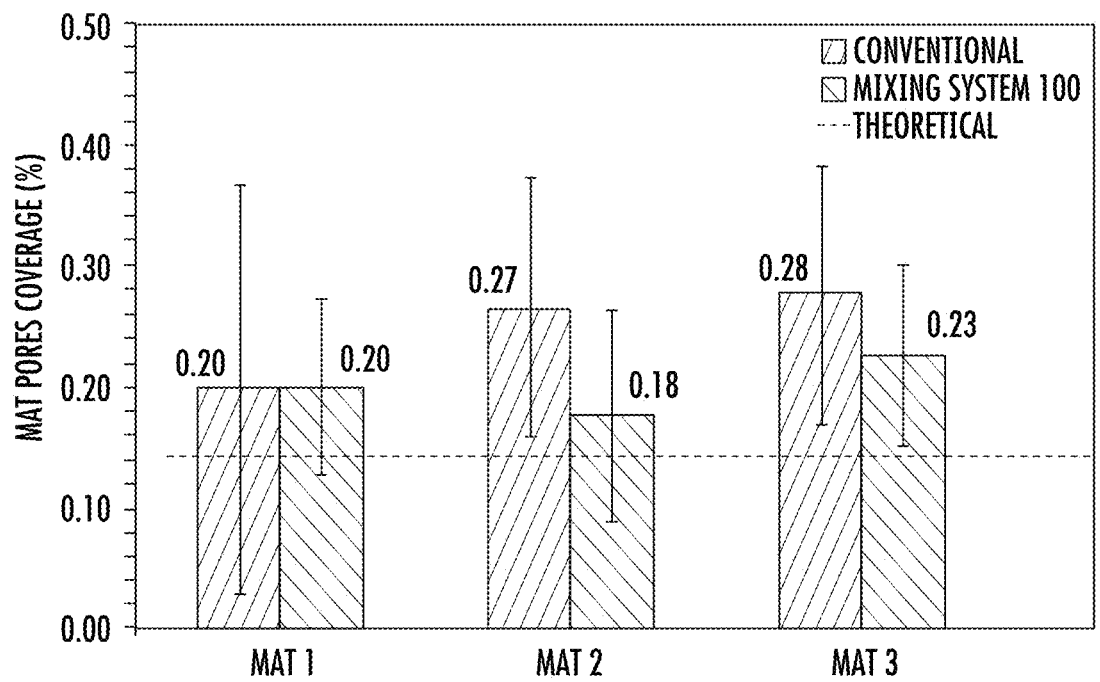
Figure 7D:
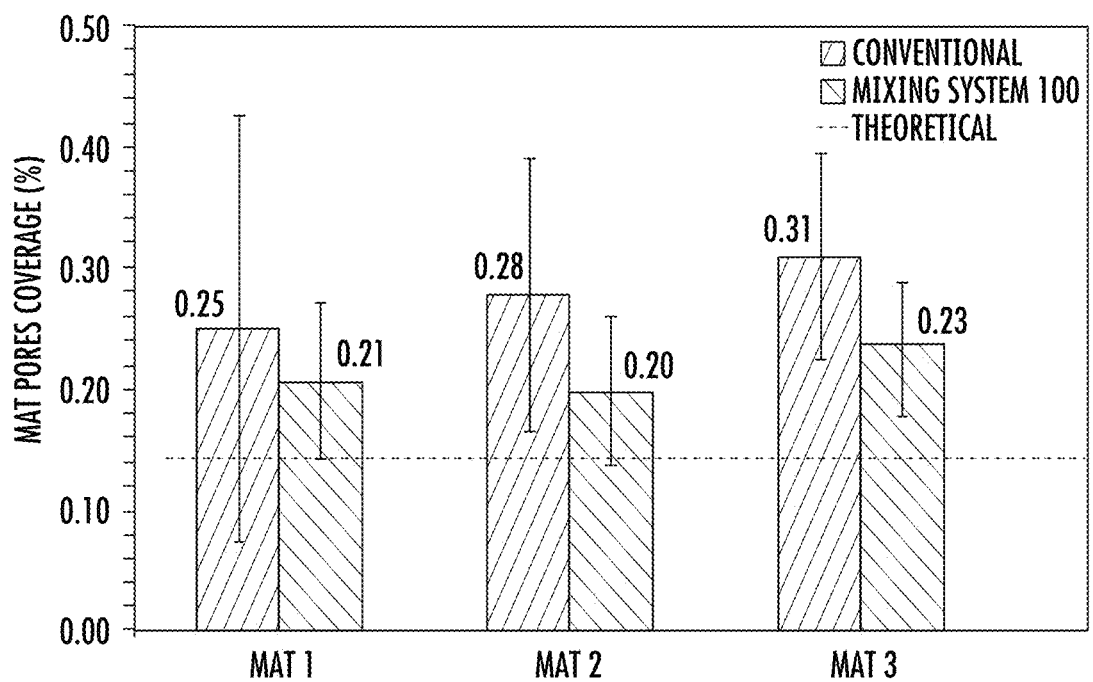
Figure 7E:
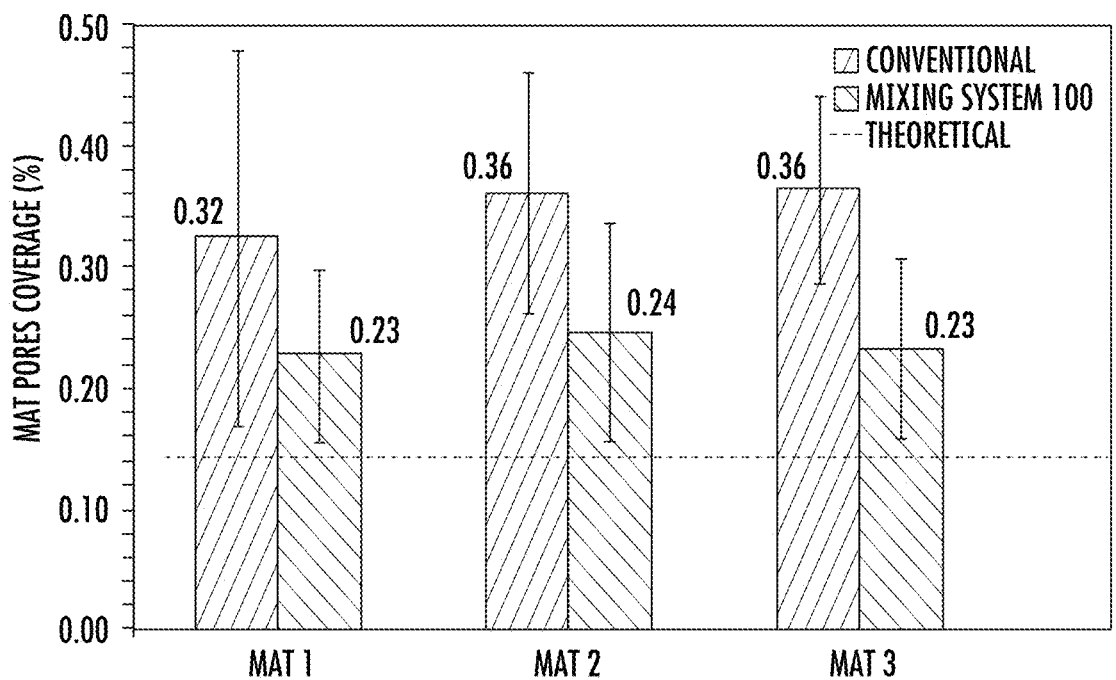
Figure 7F:
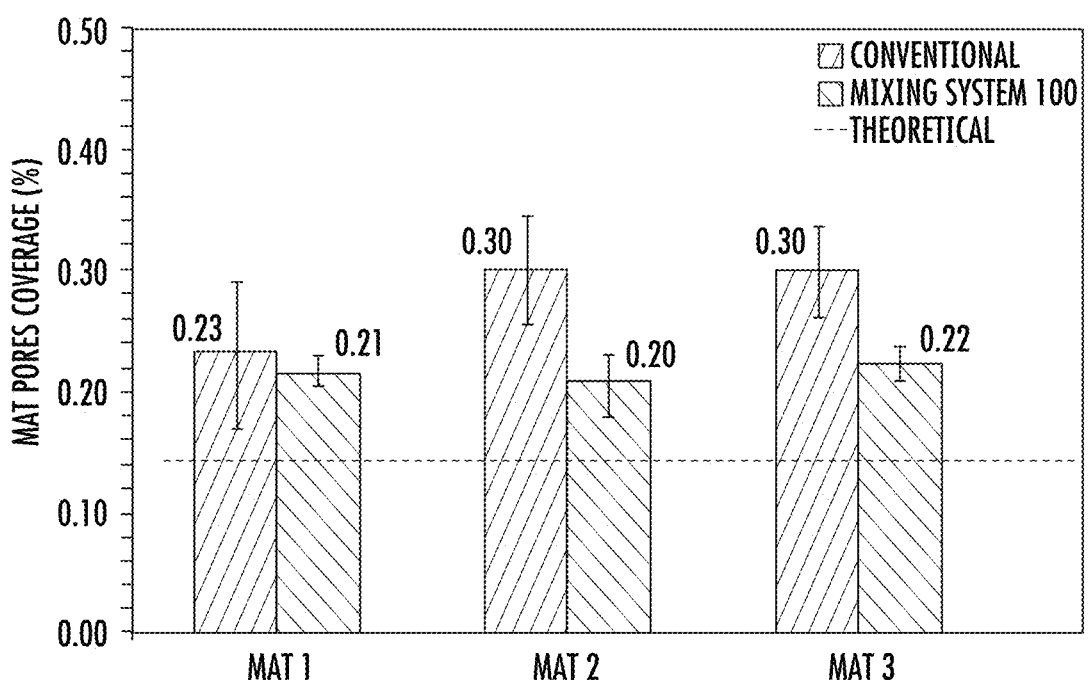

In order to study the reproducibility of each mixing method, three mats were produced for each mixing time. FIGS. 7A-7F show the reproducibility of the produced mats by both mixing methods for a fix mixing time of 20 minutes at region 1 (FIG. 7A), region 2 (FIG. 7B), region 3 (FIG. 7C), region 4 (FIG. 7D), region 5 (FIG. 7E), and as an average of all regions (FIG. 7F). the use of mixing system 100 shows higher consistency in each region with higher confined standard deviation that did not surpass the 10% value and less than 2% difference in the average mat pores coverage percentage in the same region between different mats. That was true across each of the 5 regions of interest. As for the conventional mixer, the discrepancy in average values of mat pores coverage percentage between the same regions of different mats was more than 20% difference, showing a lack of reproducibility in the mats formed using this method. FIG. 7F shows the averaged value for all the regions of interest, effectively representing the entire mat. The use of the conventional mixer showed a large standard deviation values up to 15%, 19%, 18%, 17% and 15% for each of regions 1 to 5 respectively. Despite the consistency of averaged value between all the mats, that is still remarkably high in comparison to the theoretical value. However, the results from using mixing system 100 show a standard deviation below 2% across all regions in each mat, with a higher consistency in the total mat averaging and closer result to the theoretical value. This provides an indication that mixing system 100 is equally dispersing the fibers across the entire regions of the mat with high repeatability. It was noticed that all the obtained values are higher than that of theoretical (i.e. an average of 14% and 6% increase for the conventional mixer and mixing system 100, respectively). This can be attributed to the effect of fiber settling with the draining current based on their dimensional size and physical density. Such investigation is being conducted in a separate study.

CONCLUSIONS

Mat pores coverage percentage distribution in the wet laid mats was analyzed experimentally using the back light scattering technique reflecting on its turn on the quality of fiber dispersion. The data collected proved a match between experimental finding and theoretical prediction of attaining proper dispersion through chaotic advection currents, with a significant reproducibility of results for the proposed mixer. Successfully dispersed mats with minimal defects were obtained within 20 min of mixing time of 25.4 mm long carbon fiber. The traditional method required a time of 50 min or more with no reproducibility of results. The proposed mixer results align with the theoretical work of Jayachandran [17], Ramasubramanian [26], and Fathi-Khafbadam [27]. The promotion of chaotic advection due to the crossing path of stirring elements 111 of mixing system 100 helped distribute the fibers through the volume of the vessel due to an improved mixing, the variable velocity gradient and reduced drag due to opposing fluid currents helped achieve full dispersion in shorter and more significant time of processing. The innovative mixing method validated in this work will expand opportunities for nonwoven composite applications.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter.

REFERENCES

[1] Boria S, Scattina A, Belingardi G. Experimental evaluation of a fully recyclable thermoplastic composite. Composite Structures. 2016; 140:21-35.

[2] J. G Carrillo R A G, E. A. Flores-Johnson, P. I. Gonzalez-Chi. Ballistic performance of thermoplastic composite laminates made from aramid woven fabric and polypropylene matrix. Polymer testing 31. 2012:512-9.

[3] Haibin Ning S P, Uday k. Vaidya. Design and development of thermoplastic composite roof door for mass transit bus. Materials & Design 30. 2009:983-91.

[4] Boria S, Scattina A, Belingardi G. Impact behavior of a fully thermoplastic composite. Composite Structures. 2017; 167:63-75.

[5] Chung D D L. Review: Materials for vibration damping. Journal of Materials Science 36. 2001:5733-7.

[6] Akonda M H L C, Weager B M. Recycled carbon fiber-reinforced polypropylene thermoplastic composites. Composite Part A: Applied Science and Manufacturing 43(1). 2012:79-86.

[7] Thompson J L V M, Schipper G and Krikort HGLT. Influence of fiber length and concentration on the properties of glass fiber-reinforced polypropylene: Part 3. Strength and strain failure. Composites Part A, 27A. 1996:1075-84.

[8] Thompson J L. VM. Influence of fiber length abd concentration on the properties of glass fiber-reinforced polypropylene: Part 1. Tensile and flexural modulus. Composites Part A, 27A. 1996:477-84.

[9] S. P. S. United States2000.

[10] Amaro A M, Reis P N B, Santos J B, Santos M J, Neto M A. Effect of the electric current on the impact fatigue strength of CFRP composites. Composite Structures. 2017; 182:191-8.

[11] Yang S-W C W-K. Mechanical properties of aligned long glass fiber reinforced polypropylene. I: Tensile Strength. Polymer Composites 20 (2). 1999:200-6.

[12] P. K. M. Fiber reinforced Composites: Materials, Manufacturing, and design. New York: Taylor and Francis Group; 2008.

[13] Yang S-WaC, W.-K. Mechanical Properties of Aligned Long Glass FiberReinforced Polypropylene. I: Tensile Strength. Polymer Composites. 1999; 20(2):200-6.

[14] Mallick P K. Fiber reinforced composites. New York, USA: Taylor and Francis Group; 2008.

[15] Nguyen B. N. HDJ, Johnson K. I., Smith M. T. Long-Fiber Thermoplastic Injection Molded Composites: From process modeling to property prediction. SPE Automotive Composites Conference and Exposition. Troy: SPE; 2005. p. 9.

[16] Folgar F. TCLI. Orientation behaviour of fibers in concentrated suspensions. Journal of Reinforced Plastics 3. 1984:98-119.

[17] A. J. Fundamentals of Fiber Dispersion in Water; Master Thesis. Raleigh: North Carolina State University; 2000.

[18] Harbers T. EC. Highly Efficient Production and Characterization of CFRP Made from Recycled Carbon Fibers. Sampe Journal. 2014:7-13.

[19] Feraboli P. ea. Recyclability and retilization of Carbon Fiber fabric/epoxy composites. Journal of Composite Materials 0 (0). 2011:1-15.

[20] Caba A C, Loos A C, Batra R C. Fiber-fiber interactions in carbon mat thermoplastics. Compos Part A Appl Sci Manuf 2007; 38:469-83. doi: 10.1016/j.compositesa.2006.02.024

[21] D. A. S. Characterizing the Dispersion Kinetics of synthetic Fibers in Water. Tappi Journal, 68 (8). 1985:91-9.

[22] Guan X. QX, Yang Z. Comparison of several image analysis methods for fiber dispersion uniformity in water. Journal of Dispersion Science and Technology, 38(1). 2017:19-25.

[23] Tiwari S. BJ. Surface Treatment of Carbon Fibers—A review. Procedia Technology. 2014:505-12.

[24] R. N. United States1981.

[25] Razac S. EPU. United States1995.

[26] Ramasubramanian M. K. SDA, Jayachandran A. A Computational Fluid Dynamics Modeling and Experimental Study of the mizing process for the dispersion of the Synthetic fibers in Wet-Lay forming. Journal of Engineered Fibers and Fabrics 3(1). 2008:11-20.

[27] Fathi-Khalfbadam S. LM, Sheikhzadeh-Najar S., Towhidkhah F. Analaysis and Simulation of Fiber Dispersion in Water Using a Theoretical Analogous Model. Journal of Dispersion Science and Technology, 32(3). 2011:352-8.

[28] Dweib M. A. O-BCM. Extensional and Shearing Flow if a Glass-Mat-Reinforced Thermoplastics (GMT) Materials as a Non-Newtonian Viscous Fluid. Composites Science and Technology, 59. 1999:1399-410.

[29] D. A. S. Defective Fibers in Wet-Lay Nonwoven Fabrics. Tappi Journal, 70 (6). 1998:117-21.

[30] N. N. Introduction to Fluid Mechanics. Oxford: Butterworth-Heinemann; 2000.

[31] Tafreshi H. V. PB. Role of Baffles on Flow Fields Inside Wet-Lay Mixing Tanks and Their Potential Influence on Fiber Dispersion. Textile Research Journal, 73(7). 2003: 575-82.

[32] Sun Z. XG, Chen X. A numerical study of stir mixing of liquids with particle method. Chemical Engineering Science 64. 2009:341-50.

[33] Ahmed S. F. A S M S. Fiber Suspensions in Turbulent flow with Two-Point Correlation. Bangladesh J Sci Res 46(2). 2011:265-70.

[34] H. A. Stirring by Chaotic advection. Journal of Fluid Mechanics, 143. 1984:1-21.

[35] Khakhar D. V. OJM. Fluid mixing (Stretching) by time periodic sequences for weak flows. Physics of Fluids. 1986:3503-5.

[36] S. W. J. The enhancment of mixing by chaotic advection. Physics of Fluids A: Fluid Dynamics, 3(5). 1998: 1081-6.

[37] Meleshko V. V. AH. A blinking rotlet model for chaotic advection. Physics of Fluids, 8. 1996:3215-7.

[38] Jana S. C. MG, Ottino J. M. Experimental and Computational studies of mixing in complex Stokes Flows: The vortex mixing flow and multicellular cavity flows. Journal of Fluid Mechanics, 269. 1994:199-246.

[39] B. G. Fluid Vortices. Dordrecht: Springer Netherlands; 1995.

[40] Wahjudi U. DGG, Kibblewhite R. P. An evaluation of three formation testers using radiata pine and spruce kraft pulps. Appita Jouranl, 51. 1998:423-7.

[41] Li C. D. CZF. Effect of beating revolution on dispersion of flame attenuated glass wool suspension and tensile strength of associated glass fiber wet-laid mat. Journal of Powder technology 279. 2015:221-7.

[42] Yeole P. HAA, Ning H., Vaidya U. K. The Effect of Flocculent and Dispersants on Wet-Laid Process for Recycled Glass Fiber/PA6 Composite. Journal of Polymers & Polymer Composite, 26(3). 2018:259-69.

[43] A. E. K. The Effect of Anisotropy In-Plane Liquid Distribution in Nonwoven Fabrics. Raleigh: North Carolina State University; 2001.

[44] Yang P. ER. Porosity Content Evaluation in Carbon-Fiber/Epoxy Composites Using X-ray Computed Tomography. Polymer-Plastics Technology and Engineering, 53. 2014:217-22.

[45] U. H. Scanning probe microscopy on superconductors: Achievements and challenges. Applied Physics A, 59. 1994:41-8.

[46] Weller H. G. TG, Jasak H., Fureby C. A tensorial approach to computational continuum mechanics using object-oriented techniques. Computers in physics, 12(6). 1998:620-31.

[47] Simmonds G. E. BJD, Bryner M. A. Designing Nonwovens to Meet Pore Size Specifications. Journal of Engineered Fibers and Fabric, 2(1). 2007:1-15.

What is claimed is:

1. A system for dispersing fibers in a medium comprising:
a vessel configured to receive a volume of a medium including a quantity of fibers;
one or more agitators that each comprise a stirring element that is movable in a pattern within the vessel to mechanically agitate the medium;
a drive system connected to the one or more agitators, the drive system comprising a gear assembly configured to translate rotation of the gear assembly into a pattern of movement for a respective stirring element, the gear assembly comprising:
a drive gear;
a first output gear rotationally coupled to the drive gear;
a second output gear rotationally coupled to the drive gear;
a first connecting arm pivotably coupled to both the first output gear and the stirring element; and
a second connecting arm pivotably coupled to both the second output gear and the stirring element;

wherein the first output gear and the second output gear are configured to drive movement of the stirring element, wherein the pattern of each stirring element of the one or more agitators is configured to cross paths with itself or with a pattern of another stirring element of the one or more agitators within the vessel to generate path-crossing currents that induce a chaotic advection current within the medium, wherein the stirring element is moveable in a pattern comprising a figure-eight pattern or an X-shaped pattern.

2. The system of claim 1, wherein the fibers comprise fibers selected from the group consisting of carbon fibers, glass fibers, Kevlar fibers, natural fibers, and basalt fibers.

3. The system of claim 1, wherein the one or more agitators are configured to vary traveling velocities of the stirring elements to generate a variable shear within the medium.

4. The system of claim 1, wherein the second output gear is rotationally coupled to the drive gear by an intervening idler gear.

\* \* \* \* \*